W. L. CASS.
HUMIDIFIER.
APPLICATION FILED MAR. 8, 1918.

1,292,431.

Patented Jan. 28, 1919.

Inventor,
W. L. Cass, by
G. C. Kennedy
Attorney.

UNITED STATES PATENT OFFICE.

WILLIAM L. CASS, OF MANCHESTER, IOWA, ASSIGNOR OF ONE-HALF TO DANIEL H. YOUNG, OF MANCHESTER, IOWA.

HUMIDIFIER.

1,292,431.

Specification of Letters Patent.

Patented Jan. 28, 1919.

Application filed March 8, 1918. Serial No. 221,210.

*To all whom it may concern:*

Be it known that I, WILLIAM L. CASS, a citizen of the United States of America, and a resident of Manchester, Delaware county, Iowa, have invented certain new and useful Improvements in Humidifiers, of which the following is a specification.

My invention relates to improvements in humidifiers, and the object of my improvement is to furnish heating-means for use in a humidifier, having specially formed electrodes within the boiler of the device, in circuit with a source of electric current, such heating means being formed and arranged in relation to each other and the boiler to have large efficiency, and having easily separable insulating supporting-means adapted for safe manual disassembling when desired.

Figure 1:
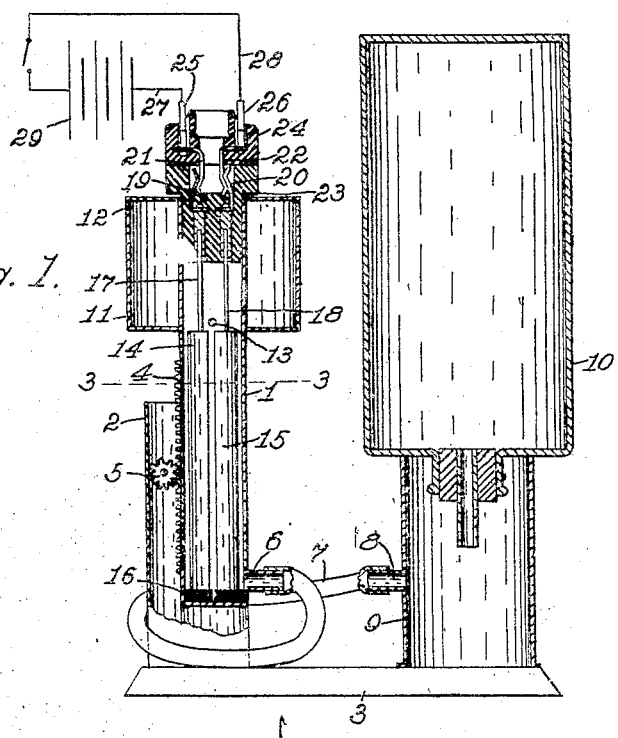
Figures 2, 3, 4:
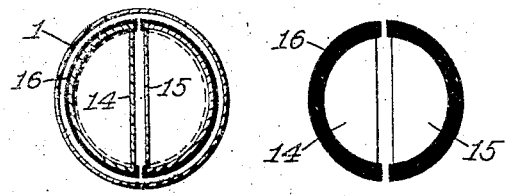

This object I have accomplished by the means which are hereinafter described and claimed, and which are illustrated in the accompanying drawings, in which Figure 1 is a vertical medial longitudinal section of my improved humidifier, showing my improved heating means installed therein; Fig. 2 is an enlarged perspective detail view of the pair of electrodes used in said humidifier; Fig. 3 is a horizontal section of the boiler and electrodes of said device, taken on the line 3—3 of said Fig. 1, and Fig. 4 is a bottom plan view of said electrodes and of their insulating spacers.

Similar numerals of reference denote corresponding parts throughout the several views.

In the drawings, the numeral 1 denotes a vertically movable hollow boiler of general cylindrical form, having about its upper end an inclosing cylindrical chamber, concentric, and of larger diameter, in communication therewith by means of orifices 13, to permit water in ebullition passing into the chamber to return again into the boiler by way of said orifices. Said chamber is closed at the top, but may have an open top, but when closed may have orifices 12 opening laterally to emit steam into the surrounding air. The numeral 2 denotes a cylindrical casing, split vertically lengthwise at one side to permit the nipple 6 on the lower end of the boiler to pass through the split when moving with the boiler up or down. The casing has its opposite side set off in a rectangular lengthwise hollow part, containing a rotatable shaft and pinion 5 rotated by a finger-disk not shown, said pinion being in mesh with a longitudinal rack on said boiler 1. By this means the boiler can be raised and lowered as desired. The casing is fixed on a base 3. Upon the other end of said base is also fixed a stationary vessel 9 open at the top and having a lateral nipple 8. A flexible tube 7 is in communication with the two nipples 6 and 8. A bottle or like receptacle 10 after being filled with water can be inverted to have its neck depend into the vessel 9, the receptacle being supported upon the upper edge of the vessel, and can deliver into said vessel directly through its neck or by means of a tube passed through a cork in the neck of the receptacle.

A pair of like electrodes 14—15 are supported within and insulated from said boiler. The electrodes are in the form of semi-cylinders, closed at both ends to form hollow bodies, and suspended on conductor-rods 17 and 18, the latter having their upper ends fixed in the lower half 23 of an insulating plug fitted removably in the upper open end of the boiler. Spring-clips 19 and 20 in a hollow in said insulator-half 23 are in circuit with said conductors and detachably connected with other spring-clip conductors 21 and 22 in hollows in the upper half 24 of said insulating plug, and these latter clips are in circuit with conductor rods 25 and 26 in circuit with conductors 27 and 28 which lead to terminals of a source of electric current 29, and the latter may be direct or alternating as desired. A switch may be inserted in said circuit as shown.

While not essential, supporting spacer half-rings 16 of insulating material or other means of insulation may be fixed on the lower ends of said electrodes, to support the lower ends of the electrodes upon and insulate them from the bottom of said boiler, and to also prevent contacts being made with the inner wall of the boiler when withdrawing the electrodes.

The sectional insulating plug 23—24 is such, that the upper half 24 may be easily separated from the lower half 23, by withdrawing the pairs of spring clips from each other, with perfect safety in the manual operation.

The two electrodes 14 and 15 have their inner flat surfaces spaced narrowly apart, in parallel relation, while their outer semicylindrical surfaces are likewise narrowly apart from the cylindric inner wall of said boiler, concentrically. This form and arrangement of the electrodes provides that the water space in the boiler about said electrodes will be of slight thickness and therefore quickly heated and converted into steam, when circuit is closed with the source of current 29. The internal resistance of the electrodes with its heating effect soon heats up the water to a high temperature, and water is kept supplied to the boiler by the vacuum operated supply system of vessels 10 and 9 with the respective conduits, and if desired, the boiler can be raised or lowered by the mechanism described, to permit the electrodes to be more or less immersed in the contents of the boiler according to the water level in said supply system.

Having described my invention, what I claim as new, and desire to secure by Letters Patent, is:

In a humidifier, a boiler, and electrodes supported therein, insulated therefrom, and in circuit with a source of electric current, the electrodes being in the form of closed hollow bodies narrowly spaced apart from each other and from the adjacent parts of the containing boiler.

Signed at Manchester, Iowa, this 21st day of Feb. 1918.

WILLIAM L. CASS.